(12) United States Patent
Kim et al.

(10) Patent No.: US 8,381,803 B2
(45) Date of Patent: Feb. 26, 2013

(54) HIGH TEMPERATURE AND HIGH PRESSURE CORROSION RESISTANT PROCESS HEAT EXCHANGER FOR A NUCLEAR HYDROGEN PRODUCTION SYSTEM

(75) Inventors: Youngwan Kim, Daejeon (KR); Jaewon Park, Daejeon (KR); Minhwan Kim, Daejeon (KR); Sungdeok Hong, Daejeon (KR); Wonjae Lee, Daejeon (KR); Jonghwa Chang, Daejeon (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 933 days.

(21) Appl. No.: 12/515,361

(22) PCT Filed: Oct. 10, 2007

(86) PCT No.: PCT/KR2007/004939
§ 371 (c)(1),
(2), (4) Date: May 18, 2009

(87) PCT Pub. No.: WO2008/069426
PCT Pub. Date: Jun. 12, 2008

(65) Prior Publication Data
US 2010/0051246 A1     Mar. 4, 2010

(30) Foreign Application Priority Data
Dec. 8, 2006   (KR) .................... 10-2006-0124716

(51) Int. Cl.
*F28F 19/02*   (2006.01)
*F28F 3/02*   (2006.01)

(52) U.S. Cl. ............... 165/133; 165/134.1; 165/166
(58) Field of Classification Search ............ 165/166
See application file for complete search history.

(56) References Cited

U.S. PATENT DOCUMENTS

| | | | | |
|---|---|---|---|---|
| 1,662,870 A | * | 3/1928 | Stancliffe | 165/166 |
| 3,570,593 A | * | 3/1971 | Isaaz et al. | 165/166 |
| 4,434,845 A | * | 3/1984 | Steeb | 165/166 |
| 4,438,809 A | * | 3/1984 | Papis | 165/166 |
| 4,582,126 A | * | 4/1986 | Corey | 165/166 |
| 4,589,265 A | | 5/1986 | Nozawa | |
| 4,823,742 A | * | 4/1989 | Davis et al. | 165/133 |

(Continued)

FOREIGN PATENT DOCUMENTS

| | | | | |
|---|---|---|---|---|
| JP | 59007898 A | * | 1/1984 | 165/133 |
| JP | 59046492 A | * | 3/1984 | 165/133 |

(Continued)

*Primary Examiner* — Leonard R Leo
(74) *Attorney, Agent, or Firm* — Bachman & LaPointe, P.C.

(57) ABSTRACT

A high-temperature and high-pressure corrosion-resistant process heat exchanger for a nuclear hydrogen production system decomposes sulfite ($SO_3$) using heat from a high-temperature gas-cooled reactor to thereby produce sulfide ($SO_2$) and oxygen ($O_2$). The process heat exchanger comprises second and third system coolant channels, each of which is defined by a heat transmission fin, which is bent in a quadrilateral shape, and heat transmission plates, and has increased corrosion resistance thanks to ion-beam coating and ion-beam mixing using a material having high corrosion resistance. The third system coolant channel includes reaction catalysts for $SO_3$ decomposition, and is made of a super alloy. Thus, a system differential pressure between the second and third system coolant channels can be greatly maintained at a high temperature of 900° C. or higher.

14 Claims, 8 Drawing Sheets

U.S. PATENT DOCUMENTS

| | | | |
|---|---|---|---|
| 5,242,016 A | 9/1993 | Voss et al. | |
| 5,251,693 A | 10/1993 | Zifferer | |
| 5,416,057 A * | 5/1995 | Lipp et al. | 165/133 |
| 5,512,250 A * | 4/1996 | Betta et al. | 165/166 |
| 5,544,703 A * | 8/1996 | Joel et al. | 165/166 |
| 5,700,434 A * | 12/1997 | Gaiser | 165/166 |
| 6,168,765 B1 * | 1/2001 | Romatier et al. | 165/166 |
| 6,347,661 B2 * | 2/2002 | Miki | 165/133 |
| 6,360,561 B2 * | 3/2002 | Allam et al. | 165/166 |
| 6,769,479 B2 * | 8/2004 | Fitzpatrick et al. | 165/166 |
| 6,829,824 B2 * | 12/2004 | Reschnar et al. | 165/166 |
| 7,272,005 B2 * | 9/2007 | Campbell et al. | 165/166 |
| 2001/0023760 A1 * | 9/2001 | Motzet et al. | 165/166 |
| 2001/0025705 A1 * | 10/2001 | Nash et al. | 165/166 |
| 2002/0131921 A1 * | 9/2002 | Ishikawa | 422/198 |

FOREIGN PATENT DOCUMENTS

| | | | |
|---|---|---|---|
| JP | 59046494 A * | 3/1984 | 165/133 |
| JP | 1990-163362 A | 6/1990 | |
| JP | 1992-311558 A | 11/1992 | |
| JP | 1993-85828 A | 11/1993 | |
| JP | 1993-320859 A | 12/1993 | |
| JP | 2001-289577 A | 10/2001 | |
| JP | 2002-323295 A | 11/2002 | |
| JP | 2005-289740 A | 10/2005 | |
| JP | 2006-021992 A | 1/2006 | |

* cited by examiner

HIGH TEMPERATURE AND HIGH PRESSURE CORROSION RESISTANT PROCESS HEAT EXCHANGER FOR A NUCLEAR HYDROGEN PRODUCTION SYSTEM

CROSS REFERENCE TO RELATED APPLICATION(S)

This application is the U.S. National Phase under 35 U.S.C. sctn. 371 of International Application No. PCT/KR2007/004939, filed on Oct. 10, 2007, which in turn claims the benefit of Korean Application No. 10-2006-0124716, filed on Dec. 8, 2006, the disclosures of which Application are incorporated by reference herein.

BACKGROUND OF THE INVENTION

1. Field of the Invention

The present invention relates to a high-temperature and high-pressure corrosion-resistant process heat exchanger, which decomposes sulfite ($SO_3$) using heat from a high-temperature gas-cooled reactor to thereby produce sulfide ($SO_2$) and oxygen ($O_2$).

2. Description of the Related Art

Heat produced from the core of a very-high-temperature gas-cooled reactor, that is, a nuclear reactor, is transmitted to an intermediate heat exchanger using helium, and then helium or a similar second system coolant transmits the heat of the intermediate heat exchanger to a process heat exchanger.

The heat from the process heat exchanger evaporates sulfuric acid (H2SO4) to produce sulfite (SO3), and then decomposes sulfite (SO3) to produce sulfide (SO2).

A system located between the very-high-temperature gas-cooled reactor and the intermediate heat exchanger is defined as a first system, and a system located between the intermediate heat exchanger and the process heat exchanger is defined as a second system. Further, a system that produces hydrogen (H2) using heat from the process heat exchanger is defined as a third system.

Generally, when one of the processes for producing hydrogen using heat generated from the nuclear reactor, i.e. an iodine-sulfuric acid (H2SO4) decomposition process, is implemented, the process heat exchanger is required for heat transmission.

In order to produce hydrogen using temperatures of 900° C. or higher generated in the nuclear reactor, two processes are required, one of which is a process of decomposing sulfuric acid (H2SO4) into water (H2O) and sulfite (SO3), and the other of which is a process of decomposing sulfite (SO3) into sulfide (SO2) and oxygen (O2) at a temperature of about 900° C. or higher.

A sulfite (SO3) decomposer, which is one of these process heat exchangers, is a heat exchanger that is operated under severe conditions, specifically, that must generally be operated at a high temperature of 900° C. or higher, that must be able to withstand a differential pressure between two loops, and that must be resistant to corrosion. This heat exchanger cannot employ an existing heat exchanger due to these temperature and corrosion conditions, and thus a solution is being developed all over the world at present.

There is a super alloy that can be used at high temperatures but not for a long time in a SO3 atmosphere due to corrosion.

At present, it is reported that there is no process heat exchanger that can carry out an SO3 decomposition reaction and realize long-term reliability at a high temperature of 900° C. or higher anywhere in the world.

In Japan, a process heat exchanger that can be used in a sulfuric acid (H2SO4) atmosphere at a temperature of 900° C. or higher using SiC ceramic, which has good corrosion resistance, is being developed, but there are many technical difficulties from the viewpoint of the production of the ceramic itself.

Further, in Europe, an attempt is being made using high-temperature metal materials. The high-temperature metal materials have no problem from the viewpoint of the production thereof, but have a problem in that the lifespan thereof is very short due to its low corrosion resistance.

SUMMARY OF THE INVENTION

Accordingly, the present invention has been made in an effort to solve the problems occurring in the related art, and an object of the present invention is to provide a process heat exchanger, which can be operated while great differential pressure is maintained at a very high temperature of 900° C. or higher, has excellent corrosion resistance to sulfite ($SO_3$), and in which the reaction catalysts for reaction acceleration with respect to an $SO_3$ channel are easily installed and exchanged.

In order to achieve the above object, according to one aspect of the present invention, there is provided a process heat exchanger, which comprises second and third system coolant channels, each of which is formed by a heat transmission fin, which is bent in a quadrilateral shape, and heat transmission plates, and which increases corrosion resistance by ion-beam coating and ion-beam mixing using a material having high corrosion resistance. The third system coolant channel includes reaction catalysts for $SO_3$ decomposition, and is made of a super alloy. The system differential pressure between the second and third system coolant channels can be greatly maintained at a high temperature of 900° C. or higher.

The high-temperature and high-pressure corrosion-resistant process heat exchanger for a nuclear hydrogen production system can be used in an environment in which SO3 corrosion occurs at a very high temperature of 900° C. or higher, and in which the system differential pressure is great. The present invention, employing the ion-beam coating and the ion-beam mixing, is directed to a heat exchanger having corrosion resistance at a very high temperature (900° C. or higher), and can overcome the problems of machining of a ceramic material having good corrosion resistance and of the low corrosion resistance of a general metal material.

Further, the present invention can be widely applied to various heat exchangers for which corrosion resistance is required in addition to an SO3 decomposer.

The third system coolant channel, the SO3 channel, is designed in a plate-fin type, so that the heat transmission characteristics are increased and the space for the reaction catalysts is secured. The hybrid process heat exchanger according to another embodiment of the present invention can increase the differential pressure between two systems, secure space for the reaction catalysts of the third system coolant channel, and maintain corrosion resistance, as can be seen from the system in which the pressure acts in the second and third system coolant channels, that is, the SO3 channels.

BRIEF DESCRIPTION OF THE DRAWINGS

The above objects, and other features and advantages of the present invention will become more apparent after a reading of the following detailed description when taken in conjunction with the drawings, in which.

DESCRIPTION OF SYMBOLS OF MAIN PARTS IN DRAWINGS

Figure 1:
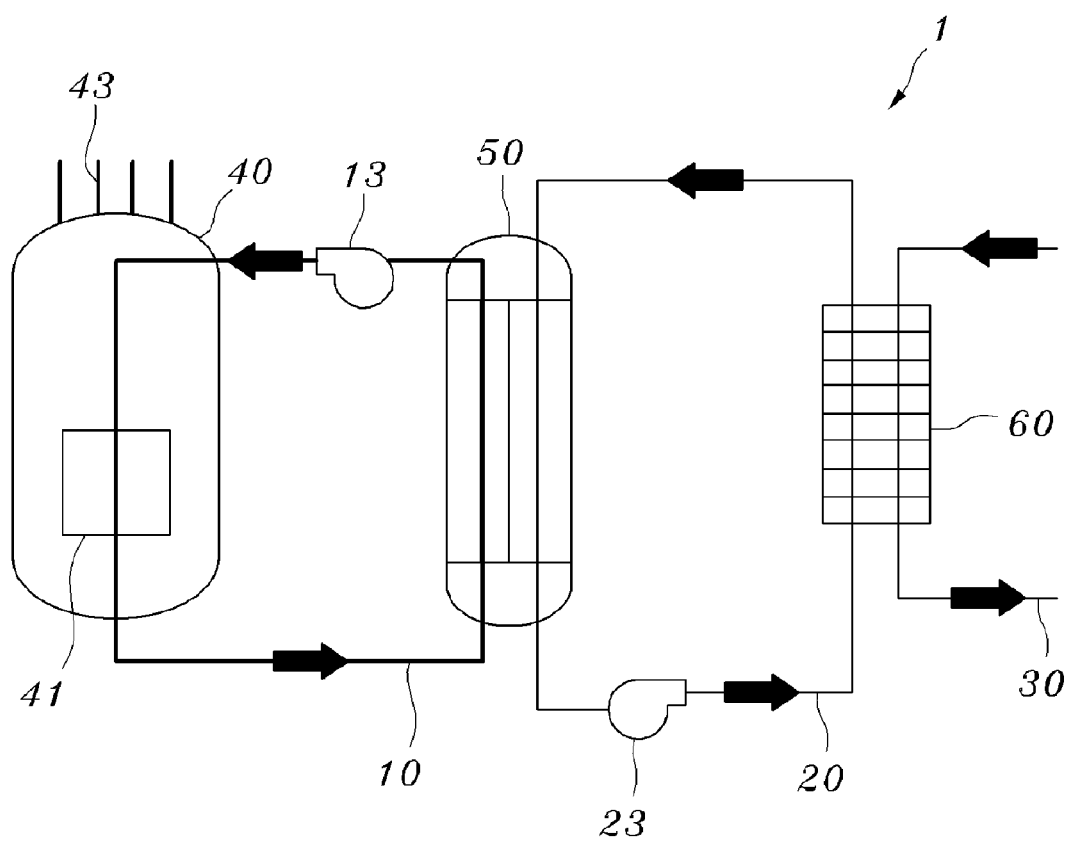
FIG. 1 schematically illustrates the layout of a nuclear hydrogen production system.

1: Nuclear hydrogen production system
10: First system loop
13: First system coolant circulator
20: Second system loop
23: Second system coolant circulator
30: Third system loop
40: Nuclear reactor
41: Core
43: Control rod driver
50: Intermediate heat exchanger
60: Process heat exchanger
61a: Second system coolant inlet header
61b: Second system coolant outlet header
62a: Third system coolant inlet header
62b: Third system coolant outlet header
63a: Second system coolant channel
63b: Third system coolant channel
65: Effective heat transmission region
65a: Heat transmission fin
65b': Heat transmission plate
67: Radius
70: High-temperature second system coolant
71: Low-temperature second system coolant
80: Low-temperature third system coolant
81: High-temperature third system coolant
90: Reaction catalyst

DESCRIPTION OF THE PREFERRED EMBODIMENTS

In order to achieve the above object, a process heat exchanger according to an embodiment of the present invention comprises:

at least one second system coolant channel, on one side of which a second system coolant inlet header, into which a high-temperature second system coolant, heated by heat from the intermediate heat exchanger, is introduced, is provided, in an intermediate portion of which an effective heat transmission region, receiving heat from the high-temperature second system coolant, is formed, on the other side of which a second system coolant outlet header, out of which a low-temperature second system coolant is discharged, is provided, and which is defined by a quadrilateral corrugated heat transmission fin 65a, which is bent at a predetermined width and height and is disposed in a transverse direction, and by heat transmission plates, which are stacked on upper and lower sides of the heat transmission fin; and at least one third system coolant channel, which is located on the upper and/or lower side of the second system coolant channel, on one side of which a third system coolant inlet header, into which a low-temperature third system coolant is introduced, is provided, in an intermediate portion of which an effective heat transmission region, transmitting heat to the low-temperature third system coolant, is formed, on the other side of which a third system coolant outlet header, out of which a high-temperature third system coolant, heated by reaction with reaction catalysts together with the heat from the effective heat transmission region, is discharged, is provided, which is defined by a quadrilateral corrugated heat transmission fin, which is bent at a predetermined width and height and is disposed in a transverse direction, and by heat transmission plates stacked on upper and lower sides of the heat transmission fin, and which includes the reaction catalysts in grooves of the corrugated heat transmission fin.

The heat transmission fins and the heat transmission plates of the second and third system coolant channels are made of a super alloy.

In the third system coolant channel, surfaces of the heat transmission fin and the heat transmission plate, which come into contact with sulfuric acid ($H_2SO_4$) and/or sulfite ($SO_3$), are subjected to ion-beam coating and ion-beam mixing using a material having high corrosion resistance, such as SiC.

The heat transmission fin is bent in a trapezoidal shape.

The heat transmission fin has a horizontal pitch H ranging from 3 mm to 8 mm.

The heat transmission fin has a vertical pitch V ranging from 3 mm to 8 mm.

Surfaces of the heat transmission fin and the heat transmission plate, which come into contact with the high-temperature second system coolant introduced from the second system coolant channel, are subjected to ion-beam coating and ion-beam mixing using a material having high corrosion resistance.

Meanwhile, a process heat exchanger according to another embodiment of the present invention comprises:

at least one second system coolant channel, on one side of which a second system coolant inlet header, into which a high-temperature second system coolant heated by heat from an intermediate heat exchanger is introduced, is provided, in an intermediate portion of which an effective heat transmission region, receiving heat from the high-temperature second system coolant, is formed, on the other side of which a second system coolant outlet header, out of which a low-temperature second system coolant is discharged, is provided, and which is defined by at least one curved channel having a semicircle or semi-ellipse with a predetermined radius in a top surface of a plano-concave heat transmission plate; and at least one third system coolant channel, which is located on the upper and/or lower side of the second system coolant channel, on one side of which a third system coolant inlet header, into which a low-temperature third system coolant is introduced, is provided, in an intermediate portion of which an effective heat transmission region, transmitting heat to the low-temperature third system coolant, is formed, on the other side of which a third system coolant outlet header, out of which high-temperature third system coolant, heated by reaction with reaction catalysts together with the heat from the effective heat transmission region, is discharged, is provided, which is defined by a quadrilateral corrugated heat transmission fin, which is bent at a predetermined width and height and is disposed between the heat transmission plate and a flat heat transmission plate in a transverse direction, and which includes the reaction catalysts in grooves of the corrugated heat transmission fin.

The radius of the second system coolant channel ranges from 0.05 mm to 4 mm.

The heat transmission fins and the heat transmission plates of the second and third system coolant channels are made of a super alloy.

In the third system coolant channel, surfaces of the heat transmission fin and the heat transmission plate, which come into contact with sulfuric acid ($H_2SO_4$) and/or sulfite ($SO_3$), are subjected to ion-beam coating and ion-beam mixing using a material having high corrosion resistance.

The heat transmission fin is bent in a trapezoidal shape.

The heat transmission fin has a horizontal pitch H ranging from 3 mm to 8 mm.

The heat transmission fin has a vertical pitch V ranging from 3 mm to 8 mm.

The surface of the heat transmission plate, which comes into contact with the high-temperature second system coolant introduced from the second system coolant channel, is subjected to ion-beam coating and ion-beam mixing using a material having high corrosion resistance.

Reference will now be made in greater detail to an exemplary embodiment of the invention, an example of which is illustrated in the accompanying drawings.

Figure 2:
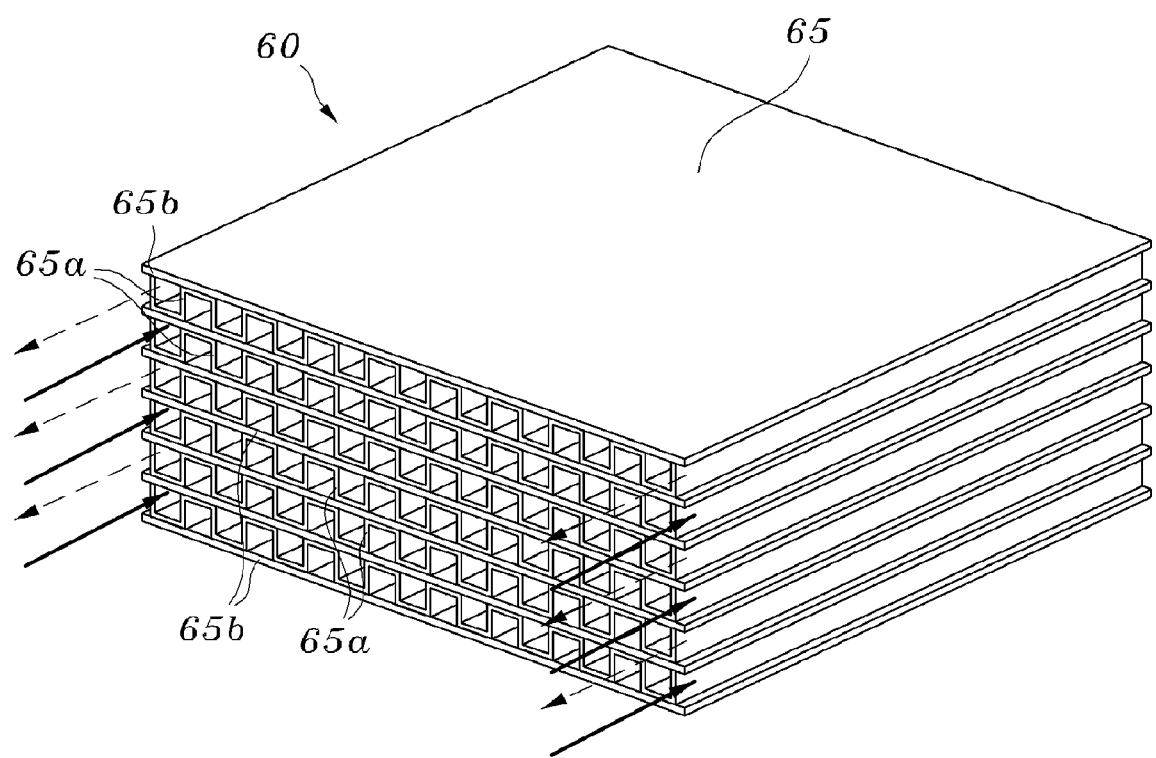
FIG. 2 is a schematic perspective view illustrating a process heat exchanger according to the present invention.
Figure 3:
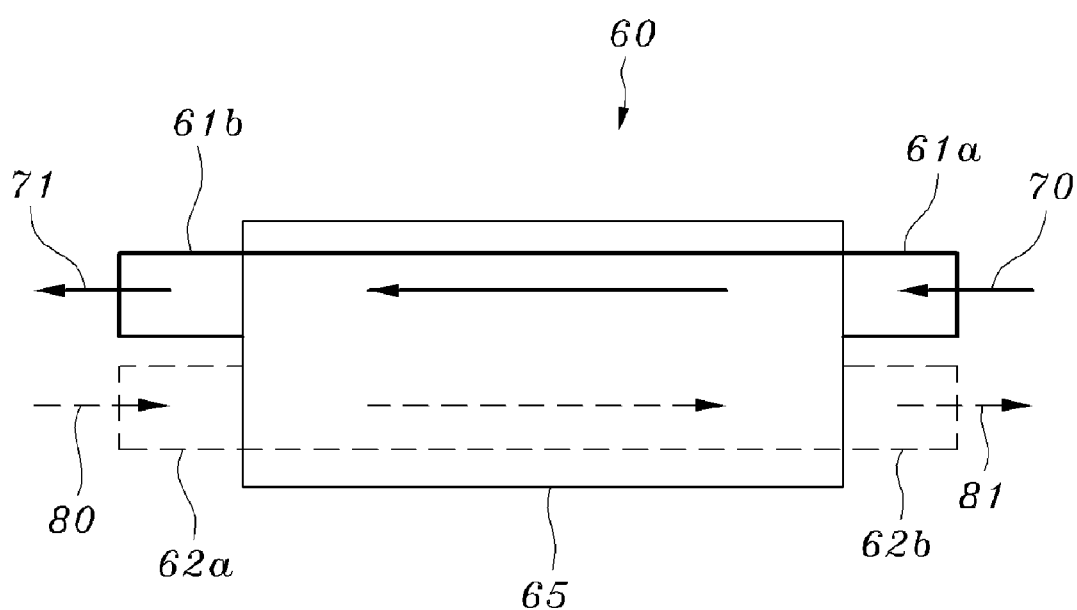
FIG. 3 is a schematic side sectional view illustrating a process heat exchanger according to the present invention.
Figure 4:
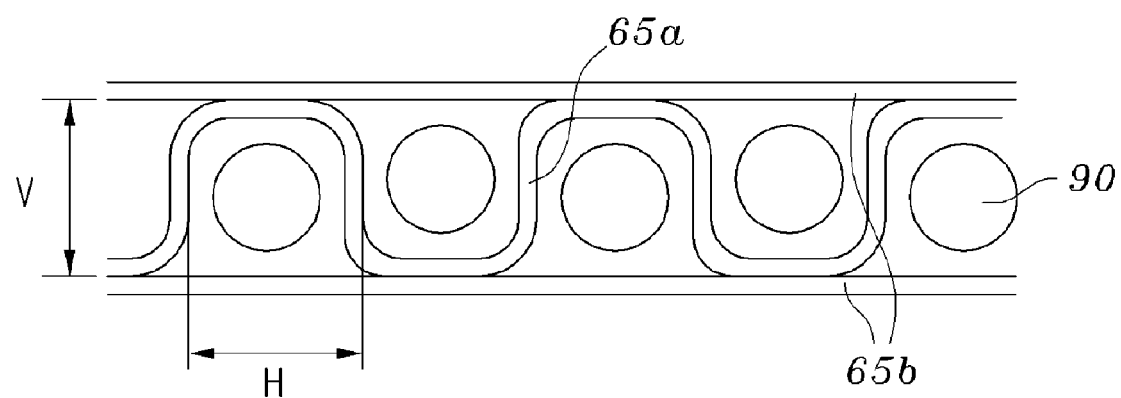
FIG. 4 is a schematic enlarged view illustrating the third system coolant channel ($SO_3$ channel) of a process heat exchanger according to the present invention.
Figure 5:
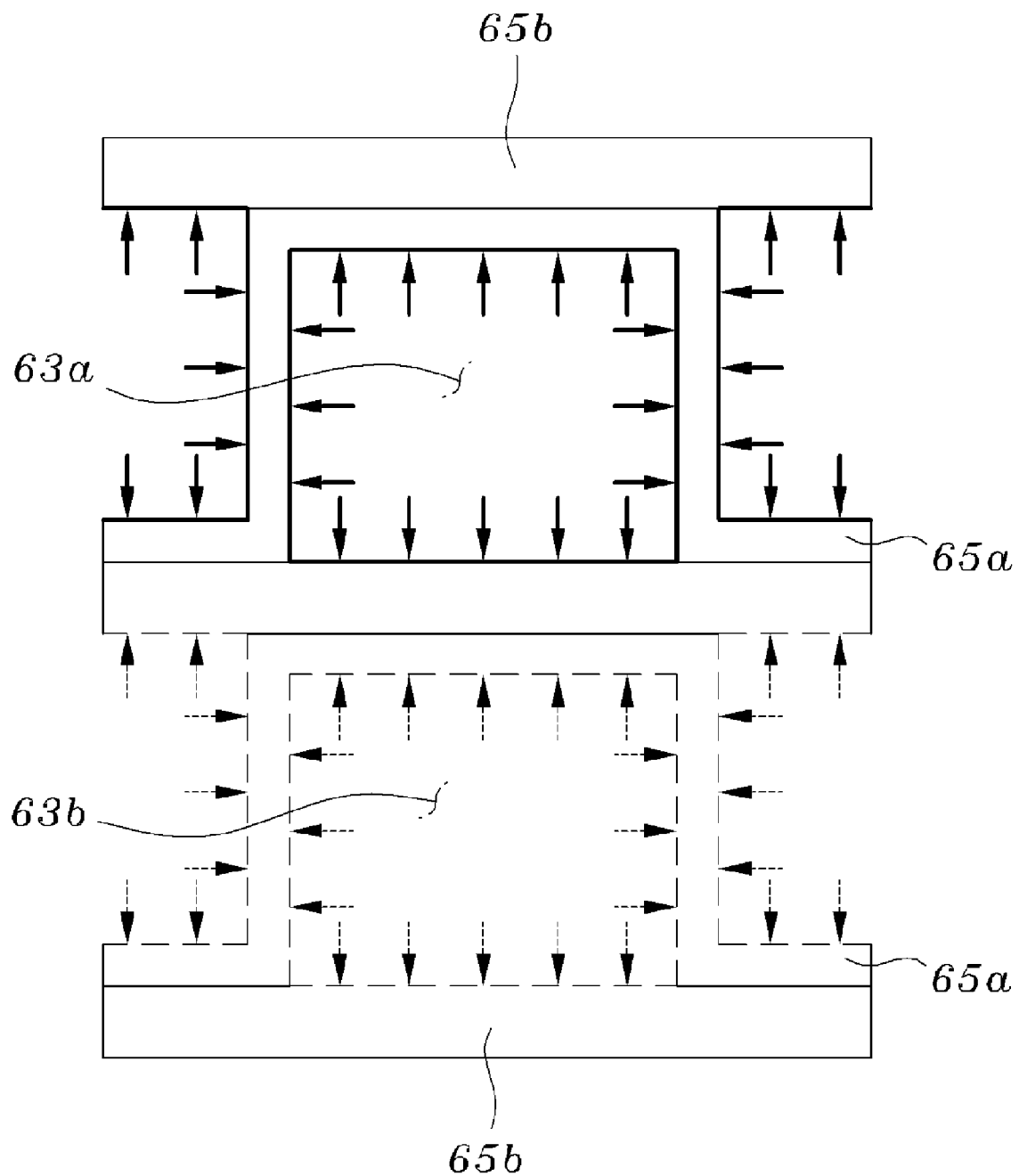
FIG. 5 is a conceptual view of a system pressure load depending on a type of cross section of the third system coolant channel ($SO_3$ channel) of a process heat exchanger according to an embodiment of the present invention.
Figure 6:
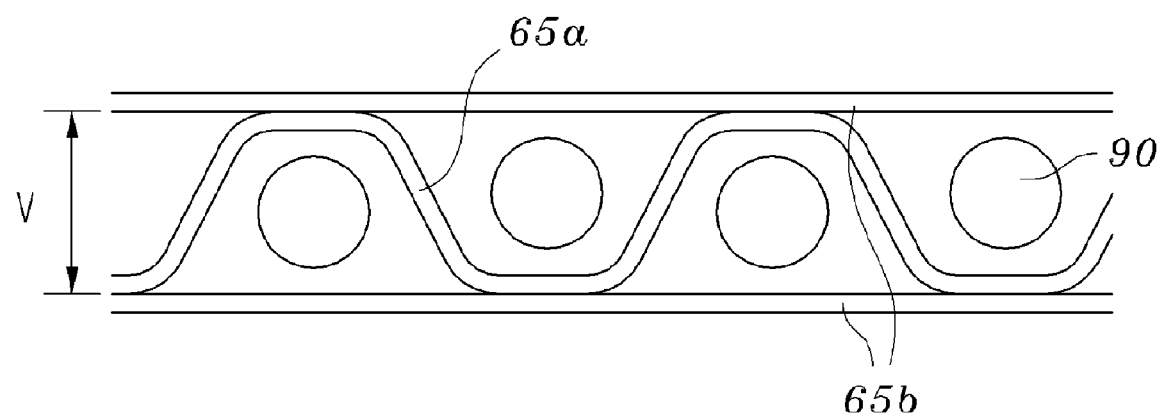
FIG. 6 is a schematic enlarged view illustrating the third system coolant channel ($SO_3$ channel) of a process heat exchanger according to a modification of an embodiment of the present invention.
Figure 7:
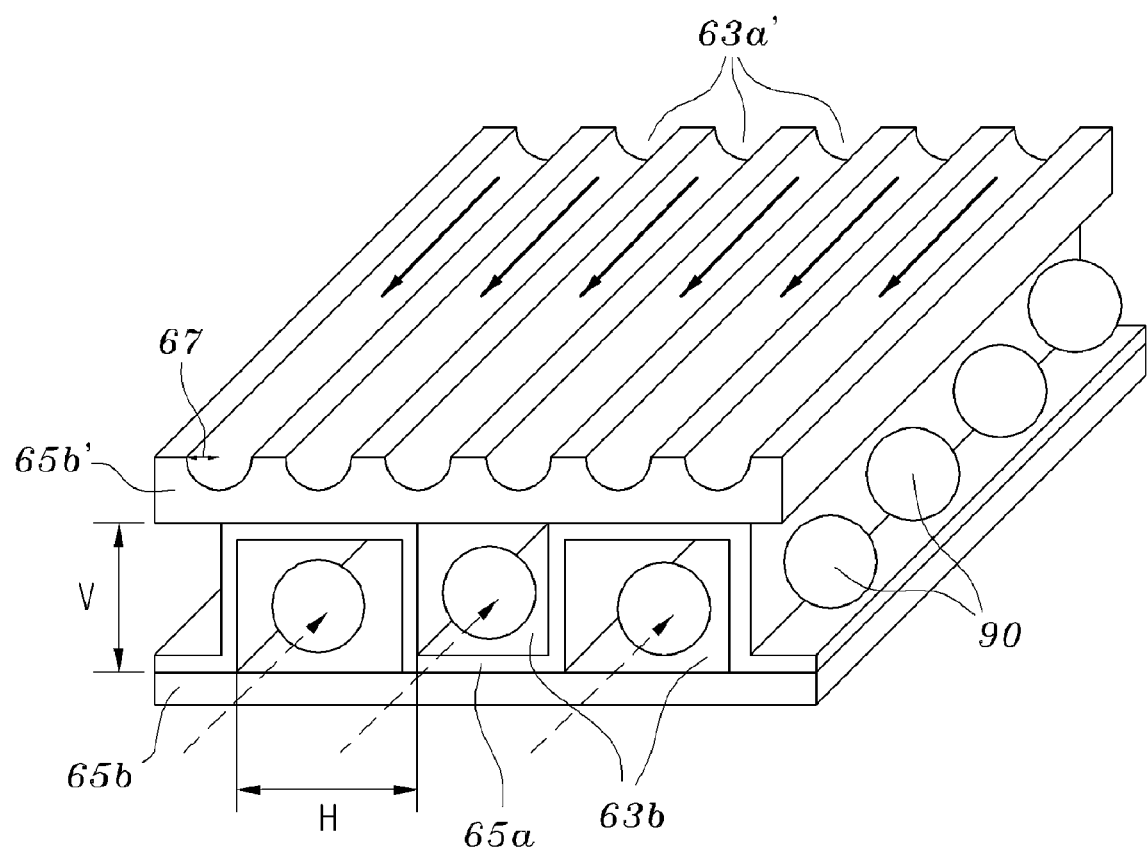
FIG. 7 is a schematic partial perspective view illustrating a process heat exchanger according to another embodiment of the present invention.
Figure 8:
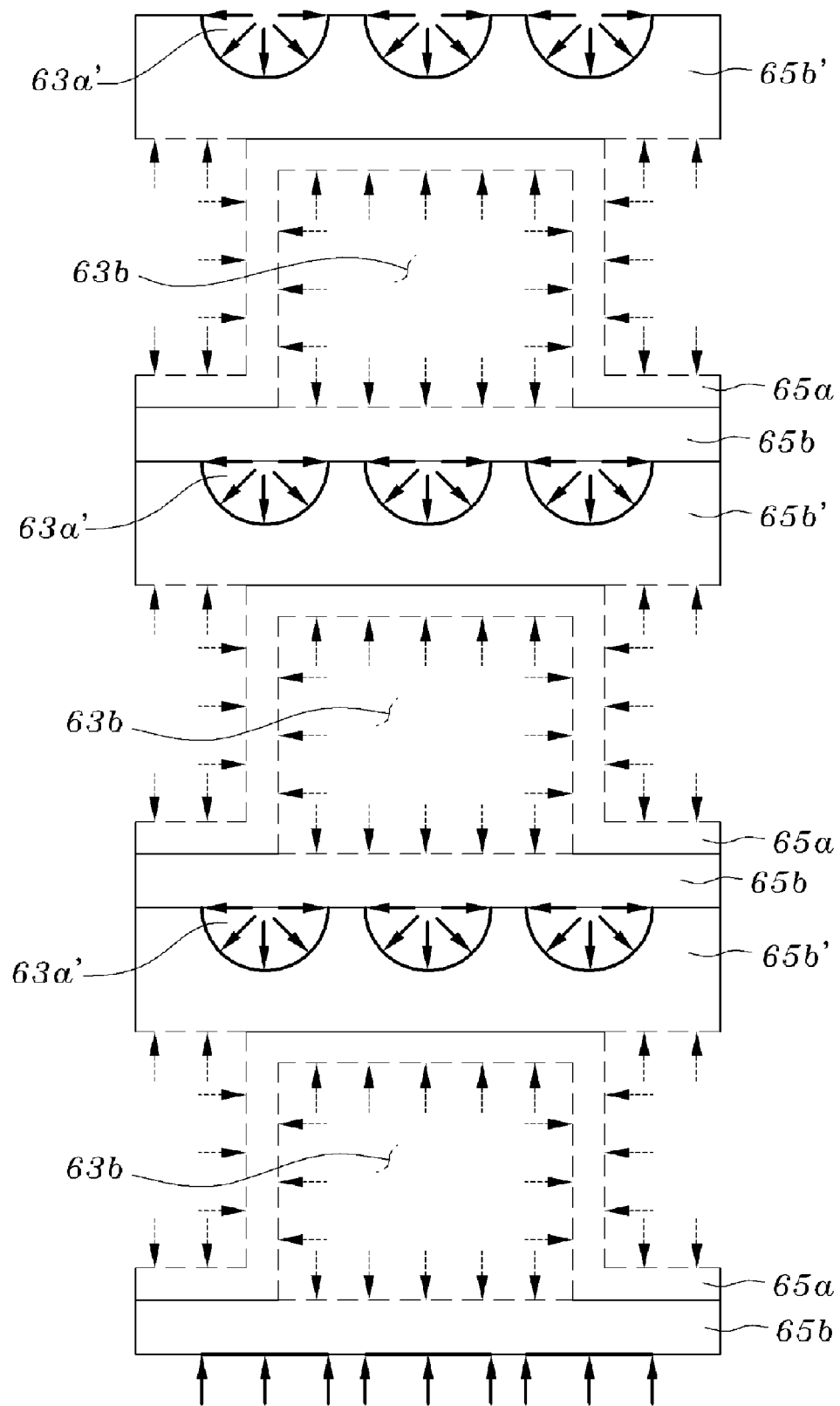
FIG. 8 is a conceptual view of a system pressure load depending on a type of cross section of the third system coolant channel ($SO_3$ channel) of a process heat exchanger according to another embodiment of the present invention.

FIG. 1 schematically illustrates the layout of a nuclear hydrogen production system. FIG. 2 is a schematic perspective view illustrating a process heat exchanger according to the present invention. FIG. 3 is a schematic side sectional view illustrating a process heat exchanger according to the present invention. FIG. 4 is a schematic enlarged view illustrating the third system coolant channel (SO3 channel) of a process heat exchanger according to the present invention. FIG. 5 is a conceptual view of a system pressure load depending on the type of cross section of the third system coolant channel (SO3 channel) of a process heat exchanger according to an embodiment of the present invention. FIG. 6 is a schematic enlarged view illustrating the third system coolant channel (SO3 channel) of a process heat exchanger according to a modification of an embodiment of the present invention. FIG. 7 is a schematic partial perspective view illustrating a process heat exchanger according to another embodiment of the present invention. FIG. 8 is a conceptual view of a system pressure load depending on the type of cross section of the third system coolant channel (SO3 channel) of a process heat exchanger according to another embodiment of the present invention.

First, as illustrated in FIG. 1, a nuclear hydrogen production system 1 comprises a first system 10, transmitting heat produced from a core 41 of a nuclear reactor 40, a very-high-temperature gas-cooled reactor, to an intermediate heat exchanger 50, a second system 20, transmitting the heat of the intermediate heat exchanger 50 to a process heat exchanger 60, and a third system 30, producing hydrogen (H2) in an iodine-sulfuric acid (H2SO4) decomposition process using the heat from the process heat exchanger 60.

Here, the coolant of the first system is transferred by a first system coolant circulator 13, and the coolant of the second system is transferred by a second system coolant circulator 23.

Thus, as illustrated in FIGS. 2 through 6, in the nuclear hydrogen production system 1 having a first system loop 10 transmitting the heat produced from the core 41 of the nuclear reactor 40 to the intermediate heat exchanger 50, a second system loop 20 forcing a second system coolant 70 to be transferred to the process heat exchanger 60 by a second system coolant circulator 23, and a third system loop 30, producing hydrogen using the heat transferred from the intermediate heat exchanger 50 to the process heat exchanger 60, the high-temperature and high-pressure corrosion-resistant process heat exchanger 60 for the nuclear hydrogen production system 1 according to the present invention comprises:

at least one second system coolant channel 63a, on one side of which a second system coolant inlet header 61a, into which the high-temperature second system coolant 70 heated by the heat from the intermediate heat exchanger 50 is introduced, is provided, in an intermediate portion of which an effective heat transmission region 65, receiving heat from the high-temperature second system coolant 70, is formed, on the other side of which a second system coolant outlet header 61b, out of which a low-temperature second system coolant 71 is discharged, is provided, and which is defined by a quadrilateral corrugated heat transmission fin 65a, which is bent at a predetermined width and height and is disposed in a transverse direction, and by heat transmission plates 65b, which are stacked on upper and lower sides of the heat transmission fin 65a; and at least one third system coolant channel 63b, which is located on the upper and/or lower side of the second system coolant channel 63a, on one side of which a third system coolant inlet header 62a, into which a low-temperature third system coolant 80 is introduced, is provided, in an intermediate portion of which an effective heat transmission region 65, transmitting heat to the low-temperature third system coolant 80, is formed, on the other side of which a third system coolant outlet header 62b, out of which a high-temperature third system coolant 81 heated by reaction with reaction catalysts 90 together with the heat from the effective heat transmission region 65 is discharged, is provided, which is defined by a quadrilateral corrugated heat transmission fin 65a, which is bent at a predetermined width and height and is disposed in a transverse direction, and by heat transmission plates 65b stacked on upper and lower sides of the heat transmission fin 65a, and which includes the reaction catalysts 90 in grooves of the corrugated heat transmission fin 65a.

More specifically, the high-temperature second system coolant 70 is introduced though the second system coolant inlet header 61a, and exits through the second system coolant outlet header 61b. While flowing from the inlet header to the outlet header, the high-temperature second system coolant 70 transmits the heat to the effective heat transmission region 65.

By contrast, the low-temperature third system coolant 80 of sulfite (SO3) is introduced though the third system coolant inlet header 62a, and exits through the third system coolant outlet header 62b. While flowing from the inlet header to the outlet header, the low-temperature third system coolant 80 receives the heat from the effective heat transmission region

65, reacts with the reaction catalysts 90 in the grooves of the corrugated heat transmission fin 65a, and is converted to the high-temperature third system coolant 81 of sulfide (SO2) and oxygen (O2).

At this time, the second system coolant channel 63a and the third system coolant channel 63b are stacked such that they alternate with each other in a vertical direction (see FIG. 2).

Meanwhile, in one embodiment of the present invention, a cross section of the channel for the low-temperature third system coolant 80 of SO3, i.e. the third system coolant channel 63b, shows that the heat transmission fin 65a is bent in a quadrilateral corrugated shape.

However, as in FIG. 6, the heat transmission fin 65a can be bent into a trapezoidal shape. This trapezoidal shape is advantageous in the aspect of processing when ion-beam coating and ion-beam mixing of the heat transmission fin 65a are performed.

The structural materials of the process heat exchanger 60, that is, the heat transmission fins 65a and the heat transmission plates 65b of the second and third system coolant channels 63a and 63b, are made of a super alloy, and thus can be used at a very high temperature of 900° C. or higher. Preferably, the structural materials of the process heat exchanger 60 include Alloy 670, Hastelloy-X, Hastelloy-XR, Hynes 230, and so on.

Further, in the third system coolant channel 63b, the surfaces of the heat transmission fin 65a and the heat transmission plate 65b come into contact with sulfuric acid (H2SO4) and/or sulfite (SO3). These surfaces are preferably subjected to ion-beam coating and ion-beam mixing using a material having high corrosion resistance, such as SiC.

Similarly, surfaces of the heat transmission fin 65a and the heat transmission plate 65b, which are in contact with the high-temperature second system coolant 70 introduced through the second system coolant channel 63a, are preferably subjected to ion-beam coating and ion-beam mixing using a material having high corrosion resistance.

In this manner, the ion-beam coating is carried out using the material having high corrosion resistance, and then the ion-beam mixing is carried out to improve adhesion. Thereby, the process heat exchanger is designed so as to have high corrosion resistance in an SO3 atmosphere.

The surfaces of the heat transmission fins 65a and the heat transmission plates 65b, which are in contact with the low-temperature third system coolant 80 of SO3, are also subjected to ion-beam coating and ion-beam mixing using a material having high corrosion resistance.

At this time, the material for the ion-beam coating and ion-beam mixing preferably include SiC, Al2O3, silicon steel, tantalum, etc., each of which has high corrosion resistance.

The ion-beam mixing method has already been disclosed in Korean Patent Application No. 10-2006-47855, entitled Coating and Ion-beam Mixing Apparatus and Method of Enhancing the Corrosion Resistance of Materials at Elevated Temperatures Using the Same, and is a kind of surface modification method in which adhesive performance is enhanced by mixing two different materials.

However, in the high-temperature and high-pressure corrosion-resistant process heat exchanger 60 for a nuclear hydrogen production system according to one embodiment of the present invention, the ion-beam coating and the ion-beam mixing are applied only to the third system coolant channel 63b, i.e. the SO3 channel, for which corrosion resistance is required, but not to the loop connected with the nuclear reactor.

In other words, the super alloy is designed to maintain its strength at high temperature, and the materials subjected to the ion-beam coating and then the ion-beam mixing are designed to withstand corrosive environments.

However, the process heat exchanger 60 according to one embodiment of the present invention can be used in strongly corrosive environments other than sulfuric acid (H2SO4) and/or sulfite (SO3).

The process heat exchanger 60 according to one embodiment of the present invention is designed so that the third system coolant channel 63b, i.e. the SO3 channel, has a plate-fin structure so as to receive the reaction catalysts 90 for SO3 decomposition and easily exchange the reaction catalysts 90.

Since each reaction catalyst 90 has a size of about 3 mm, the plate-fin type channel must have a size of at least 3 mm, and most preferably a size ranging from 3 mm to 8 mm.

The high-temperature second system coolant 70, transmitting the heat from the nuclear reactor, can make use of various coolants such as helium (He), molten salt, nitrogen, and so on. Among these coolants, He is most frequently used. Regardless of which of these coolants is used, the channel of the process heat exchanger 60 is not really required to be corrosion-resistant.

Thus, the ion-beam coating and the ion-beam mixing are not applied to the second system coolant channel 63a, through which the high-temperature second system coolant 70 flows, and which is connected with the nuclear reactor side. Further, the second system coolant channel 63a does not need a space in which to place the reaction catalyst.

In the process heat exchanger 60 according to the present invention, the shape of the channel through which the second system coolant, such as He, flows is applied both to the design in which the concept of the plate-fin type process heat exchanger according to one embodiment of the present invention is used and to the design in which the concept of a plate type process heat exchanger, described below, having a semicircle, the radius of which ranges from 0.05 mm to 2.5 mm, that is, the diameter thereof ranges from 0.1 mm to 5 mm, is used.

The horizontal pitch H and the vertical pitch V of the heat transmission fin 65a must exceed at least 3 mm such that sufficient space to easily contain and exchange the reaction catalysts 90 can be secured. However, each pitch preferably ranges from 3 mm to 8 mm, because the greater the pitch is, the smaller the allowable differential pressure is.

Thus, the permissible differential pressure can be further increased by setting the horizontal and vertical pitches H and V of the heat transmission fin 65a within a preferable range, i.e. within a range from 3 mm to 8 mm, so that the heat transmission fin 65a can support a high pressure load.

Meanwhile, as illustrated in FIGS. 7 and 8, in the nuclear hydrogen production system 1 having a first system loop 10 transmitting the heat produced from the core 41 of the nuclear reactor 40 to the intermediate heat exchanger 50, a second system loop 20 forcing a second system coolant 70 to be transferred to a process heat exchanger 60 by a second system coolant circulator 23, and a third system loop 30 producing hydrogen using the heat transferred from the intermediate heat exchanger 50 to the process heat exchanger 60, the high-temperature and high-pressure corrosion-resistant process heat exchanger 60 for the nuclear hydrogen production system 1 according to another embodiment of the present invention comprises:

at least one second system coolant channel 63a, on one side of which a second system coolant inlet header 61a, into which the high-temperature second system coolant 70 heated by the heat from the intermediate heat exchanger

50 is introduced, is provided, in an intermediate portion of which an effective heat transmission region 65, receiving heat from the high-temperature second system coolant 70, is formed, on the other side of which a second system coolant outlet header 61b, out of which a low-temperature second system coolant 71 is discharged, is provided, and which is defined by at least one curved channel having a semicircle or semi-ellipse with a predetermined radius 67 in the top surface of a plano-concave heat transmission plate 65b'; and at least one third system coolant channel 63b, which is located on the upper and/or lower side of the second system coolant channel 63a, on one side of which a third system coolant inlet header 62a, into which a low-temperature third system coolant 80 is introduced, is provided, in an intermediate portion of which an effective heat transmission region 65, transmitting heat to the low-temperature third system coolant 80, is formed, on the other side of which a third system coolant outlet header 62b, out of which a high-temperature third system coolant 81, heated by reaction with reaction catalysts 90 together with the heat from the effective heat transmission region 65 is discharged, is provided, which is defined by a quadrilateral corrugated heat transmission fin 65a, which is bent at a predetermined width and height and is disposed between the plano-concave heat transmission plate 65b' and a flat heat transmission plate 65b in a transverse direction, and which includes the reaction catalysts 90 in grooves of the corrugated heat transmission fin 65a.

At this time, the second system coolant channel 63a is formed by the semicircular channel having the radius 67 from 0.05 mm to 2.5 mm, that is, a diameter from 0.1 mm to 5 mm.

This realizes an advantage in that an operation differential pressure between the second system and the third system is increased, wherein the second system, that is, the intermediate system is located between the intermediate heat exchanger 50 and the process heat exchanger 60, and the third system produces hydrogen (H2) using the heat from the process heat exchanger 60.

In other words, unlike one embodiment of the present invention, the differential pressure between the second system coolant channel 63a and the third system coolant channel 63b can be remarkably increased by modifying the shape of the second system coolant channel 63a. Thus, the great differential pressure between the second system coolant channel 63a and the third system coolant channel 63b allows the structures of the heat transmission fin 65a and the heat transmission plate 65b to satisfactorily support, if present, a much greater pressure load (see FIG. 8).

In greater detail, the heat transmission plate 65b' made of a super alloy plate is subjected to chemical etching or precise machining. Thereby, the second system coolant channel 63a, which is the curved channel having the semicircle or semi-ellipse, has a diameter equal to or less than 5 mm, that is, between 0.1 mm and 5 mm.

By contrast, the third system coolant outlet header 62b, through which the low-temperature third system coolant 80 of sulfite (SO3) flows, maintains the cross section (FIG. 4) of the plate-fin type process heat exchanger in order to secure the space in which the reaction catalysts 90 can be contained, as in one embodiment of the present invention.

In the process heat exchanger 60, the heat transmission fins 65a and the heat transmission plates 65b, 65b' of the second and third system coolant channels 63a and 63b are made of a super alloy, and thus can be used at a very high temperature of 900° C. or higher.

Further, in the third system coolant channel 63b, the surfaces of the heat transmission fin 65a and the heat transmission plates 65b and 65b' come into contact with sulfuric acid (H2SO4) and/or sulfite (SO3). These surfaces are subjected to ion-beam coating and ion-beam mixing using a material having high corrosion resistance. Thereby, the process heat exchanger 60 can have improved corrosion resistance to sulfuric acid (H2SO4) and/or sulfite (SO3).

The horizontal pitch H and the vertical pitch V of the heat transmission fin 65a preferably have a range from 3 mm to 8 mm, such that sufficient space to easily contain and exchange the reaction catalysts 90 can be secured.

Further, the heat transmission fin 65a can be bent to have a trapezoidal shape. This trapezoidal shape makes it possible to secure enough space to easily contain and exchange the reaction catalysts 90.

The surface of the heat transmission plate 65b', which is in contact with the high-temperature second system coolant 70, introduced through the second system coolant channel 63a, undergoes ion-beam coating and ion-beam mixing using a material having high corrosion resistance. Thus, the process heat exchanger 60 can be used in highly corrosive environments other than sulfuric acid (H2SO4) and/or sulfite (SO3).

In the drawings and specification, typical exemplary embodiments of the invention have been disclosed, and although specific terms are employed, they are used in a generic and descriptive sense only and are not for the purposes of limitation, the scope of the invention being set forth in the following claims.

As can be apparent from the above, the process heat exchanger of the present invention can be operated with great differential pressure maintained at a very high temperature of 900° C. or higher, has excellent corrosion resistance against sulfite ($SO_3$), and permits easy installation and exchange of the reaction catalysts for reaction acceleration with respect to the $SO_3$ channel.

What is claimed is:

1. A high-temperature and high-pressure corrosion-resistant process heat exchanger (60) for a nuclear hydrogen production system, comprising:

at least one second system coolant channel (63a), on one side of which a second system coolant inlet header (61a), into which a high-temperature second system coolant (70), heated by heat from the intermediate heat exchanger (50), is introduced, is provided, in an intermediate portion of which an effective heat transmission region (65), receiving heat from the high-temperature second system coolant (70), is formed, on the other side of which a second system coolant outlet header (61b), out of which a low-temperature second system coolant (71) is discharged, is provided, and which is defined by a quadrilateral corrugated heat transmission fin (65a), which is bent at a predetermined width and height and is disposed in a transverse direction, and by heat transmission plates, which are stacked on upper and lower sides of the heat transmission fin (65b); and at least one third system coolant channel (63b), which is located on the upper and/or lower side of the second system coolant channel (63a), on one side of which a third system coolant inlet header (62a), into which a low-temperature third system coolant (80) is introduced, is provided, in an intermediate portion of which an effective heat transmission region (65), transmitting heat to the low-temperature third system coolant (80), is formed, on the other side of which a third system coolant outlet header (62b), out of which a high-temperature third system coolant (81), heated by reaction with reaction catalysts (90) together with the heat from the effective heat transmission region (65), is discharged, is provided, which is defined by a quadrilateral corrugated heat transmission fin (65a), which is bent at a predetermined width and height and is disposed in a transverse direction, and by heat transmission plates stacked on upper and lower sides of the heat transmission fin (65b), and which includes the reaction catalysts (90) in grooves of the corrugated heat transmission fin (65a), wherein the heat transmission fins (65a) and the heat transmission plates (65b) of the second and third system coolant channels (63a and 63b) are made of a super alloy; and in the third system coolant channel (63b), surfaces of the heat transmission fin (65a) and the heat transmission plate (65b), which come into contact with sulfuric acid ($H_2SO_4$) and/or sulfite ($SO_3$), are subjected to ion-beam coating and ion-beam mixing using a material having high corrosion resistance.

2. The process heat exchanger according to claim 1, wherein the material having high corrosion resistance comprises SiC.

3. The process heat exchanger according to claim 1, wherein the heat transmission fin (65a) is bent in a trapezoidal shape.

4. The process heat exchanger according to claim 3, wherein the heat transmission fin (65a) has a horizontal pitch (H) ranging from 3 mm to 8 mm.

5. The process heat exchanger according to claim 3, wherein the heat transmission fin (65a) has a vertical pitch (V) ranging from 3 mm to 8 mm.

6. The process heat exchanger according to claim 1, wherein surfaces of the heat transmission fin (65a) and the heat transmission plate (65b) that come into contact with the high-temperature second system coolant (70), introduced from the second system coolant channel (63a), are subjected to ion-beam coating and ion-beam mixing using a material having high corrosion resistance.

7. A high-temperature and high-pressure corrosion-resistant process heat exchanger for a nuclear hydrogen production system (1), in which the nuclear hydrogen production system (1) has a first system loop (10) transmitting heat produced from a core (41) of a nuclear reactor (40) to an intermediate heat exchanger (50), a second system loop (20) forcing a second system coolant (70) to be transferred to a process heat exchanger (60) by a second system coolant circulator (23), and a third system loop (30) producing hydrogen using heat transferred from the intermediate heat exchanger (50) to the process heat exchanger (60), the process heat exchanger (60) comprising:

at least one second system coolant channel (63a'), on one side of which a second system coolant inlet header (61a), into which the high-temperature second system coolant (70) heated by the heat from the intermediate heat exchanger (50) is introduced, is provided, in an intermediate portion of which an effective heat transmission region (65), receiving heat from the high-temperature second system coolant (70), is formed, on another side of which a second system coolant outlet header (61b), out of which a low-temperature second system coolant (71) is discharged, is provided, and which is defined by at least one curved channel having a semicircle or semi-ellipse with a predetermined radius (67) in a top surface of a plano-concave heat transmission plate (65b'); and at least one third system coolant channel (63b), which is located on the upper and/or lower side of the second system coolant channel (63a'), on one side of which a third system coolant inlet header (62a), into which a low-temperature third system coolant (80) is introduced, is provided, in an intermediate portion of which an effective heat transmission region (65), transmitting heat to the low-temperature third system coolant (80), is formed, on another side of which a third system coolant outlet header (62b), out of which a high-temperature third system coolant (81) heated by reaction with reaction catalysts (90) together with heat from the effective heat transmission region (65) is discharged, is provided, which is defined by a quadrilateral corrugated heat transmission fin (65a), which is bent at a predetermined width and height and is disposed between the heat transmission plate (65b') and a flat heat transmission plate (65b) in a transverse direction, and which includes the reaction catalysts (90) in grooves of the corrugated heat transmission fin (65a), wherein the heat transmission fins (65a) and the heat transmission plates (65b and 65b') of the second and third system coolant channels (63a and 63b) are made of a super alloy; and in the third system coolant channel (63b), surfaces of the heat transmission fin (65a) and the heat transmission plate (65b) that come into contact with sulfuric acid ($H_2SO_4$) and/or sulfite ($SO_3$) are subjected to ion-beam coating and ion-beam mixing using a material having high corrosion resistance.

8. The process heat exchanger according to claim 7, wherein the radius (67) of the second system coolant channel (63a) has a range from 0.05 mm to 2.5 mm.

9. The process heat exchanger according to claim 7, wherein the heat transmission fin (65a) has a vertical pitch V ranging from 3 mm to 8 mm.

10. The process heat exchanger according to claim 7, wherein a surface of the heat transmission plate (65b') that comes into contact with the high-temperature second system coolant (70), introduced from the second system coolant channel (63a'), is subjected to ion-beam coating and ion-beam mixing using a material having high corrosion resistance.

11. The process heat exchanger according to claim 7, wherein the material having high corrosion resistance comprises SiC.

12. The process heat exchanger according to claim 7, wherein the heat transmission fin (65a) is bent in a trapezoidal shape.

13. The process heat exchanger according to claim 12, wherein the heat transmission fin (65a) has a horizontal pitch (H) ranging from 3 mm to 8 mm.

14. The process heat exchanger according to claim 12, wherein the heat transmission fin (65a) has a vertical pitch (V) ranging from 3 mm to 8 mm.

* * * * *